(12) United States Patent
Ono et al.

(10) Patent No.: US 9,143,755 B2
(45) Date of Patent: Sep. 22, 2015

(54) IMAGE PROCESSING DEVICE

(75) Inventors: Toshiyuki Ono, Kanagawa (JP);
Yasunori Taguchi, Kanagawa (JP);
Nobuyuki Matsumoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 864 days.

(21) Appl. No.: 13/179,676

(22) Filed: Jul. 11, 2011

(65) Prior Publication Data

US 2012/0076433 A1 Mar. 29, 2012

(30) Foreign Application Priority Data

Sep. 27, 2010 (JP) ................................ 2010-214790

(51) Int. Cl.
*G06K 9/00* (2006.01)
*H04N 13/00* (2006.01)
(52) U.S. Cl.
CPC ................................ *H04N 13/0018* (2013.01)
(58) Field of Classification Search
USPC ........................................................ 382/254
See application file for complete search history.

(56) References Cited

U.S. PATENT DOCUMENTS

| | | | | |
|---|---|---|---|---|
| 8,553,942 | B2 * | 10/2013 | Lynch | 382/106 |
| 2011/0026051 | A1 * | 2/2011 | Wang | 358/1.9 |
| 2012/0070069 | A1 | 3/2012 | Taguchi et al. | |
| 2012/0320239 | A1 * | 12/2012 | Uehara | 348/239 |
| 2013/0121562 | A1 * | 5/2013 | Barnum | 382/154 |
| 2014/0015919 | A1 * | 1/2014 | Lynch | 348/36 |

FOREIGN PATENT DOCUMENTS

| | | |
|---|---|---|
| JP | 2004-363680 | 12/2004 |
| JP | 2005-018529 | 1/2005 |
| JP | 2007-329902 | 12/2007 |
| JP | 2008-176447 | 7/2008 |
| JP | 2009-53748 | 12/2009 |
| JP | 2010-147937 | 1/2010 |
| JP | 2010-154422 | 8/2010 |
| JP | 2010-206362 | 9/2010 |

OTHER PUBLICATIONS

Miyaoka. Gradient-Domain Image Filtering, IPSJ SIG Technical Report, vol. 109, No. 182, pp. 143-150.
Japanese Office Action for Japanese Application No. 2010-214790 mailed on Aug. 14, 2012.

* cited by examiner

*Primary Examiner* — Wesley Tucker
(74) *Attorney, Agent, or Firm* — Amin, Turocy & Watson, LLP

(57) ABSTRACT

According to one embodiment, an image processing device includes an obtaining unit, a separating unit, a processing unit and a combining unit. The obtaining unit obtains a depth value of a subject imaged on an input image. The separating unit separates the input image into a first component that is a component including a gradation and a second component that is a component other than the first component. The processing unit enhances the first component in accordance with the depth value to generate a processed component. The combining unit combines the processed component and the second component to generate a combined component.

12 Claims, 6 Drawing Sheets

IMAGE PROCESSING DEVICE

CROSS-REFERENCE TO RELATED APPLICATIONS

This application is based upon and claims the benefit of priority from Japanese Patent Application No. 2010-214790, filed on Sep. 27, 2010; the entire contents of which are incorporated herein by reference.

FIELD

Embodiments described herein relate generally to an image processing device that enhances a three-dimensional appearance of an image.

BACKGROUND

A captured image can be viewed three dimensionally by binocular stereopsis if a distance from an imaging device such as a camera to a subject of the captured image is known. This can be made by generating two images that are shifted from each other to an extent corresponding to a binocular disparity based on the distance and by observing the images with the right eye and the left eye, respectively. In order to implement such a system, however, it is necessary to provide a display configured to divide pictures for the right eye and the left eye spatially or temporally and display the divided pictures, for example. In addition, the configuration is complex since a viewer has to wear glasses for the system, for example. Thus, if pictures can be displayed two-dimensionally with an enhanced three-dimensional appearance, simplified stereoscopic pictures can be viewed, which is advantageous to viewers.

Enhancement of shades of a subject increases uneven impression thereof and produces an effect of enhancing the three-dimensional appearance of the image. Uneven impression is defined herein as expressiveness of the unevenness of a subject surface. A technique of enhancing the gradation of an image, which is one element to express shades, is known as a technique for producing uneven impression. In this technique, a gradient of an image is calculated and a component with a gradient whose magnitude is small is enhanced to produce the effect.

In the conventional technology, however, the shades are enhanced uniformly on the entire screen. Thus, the uneven impression of a distant background, for example, is also increased. A subject with increased uneven impression is perceived to be nearer than that before being processed. Therefore, there has been a disadvantage that the distance between the foreground and the background is perceived to be small, which results in an image having a flat composition with a low depth feel. A depth feel is defined herein as expressiveness of a distance in the depth direction between subjects. Uneven impression and a depth feel are both considered to be main components providing a three-dimensional appearance of an image.

DETAILED DESCRIPTION

In general, according to one embodiment, an image processing device includes an obtaining unit, a separating unit, a processing unit and a combining unit. The obtaining unit obtains a depth value of a subject imaged on an input image. The separating unit separates the input image into a first component that is a component including a gradation and a second component that is a component other than the first component. The processing unit enhances the first component in accordance with the depth value to generate a processed component. The combining unit combines the processed component and the second component to generate a combined component.

Embodiments of an image processing device will be described below in detail with reference to the accompanying drawings.

First Embodiment

Figure 1:
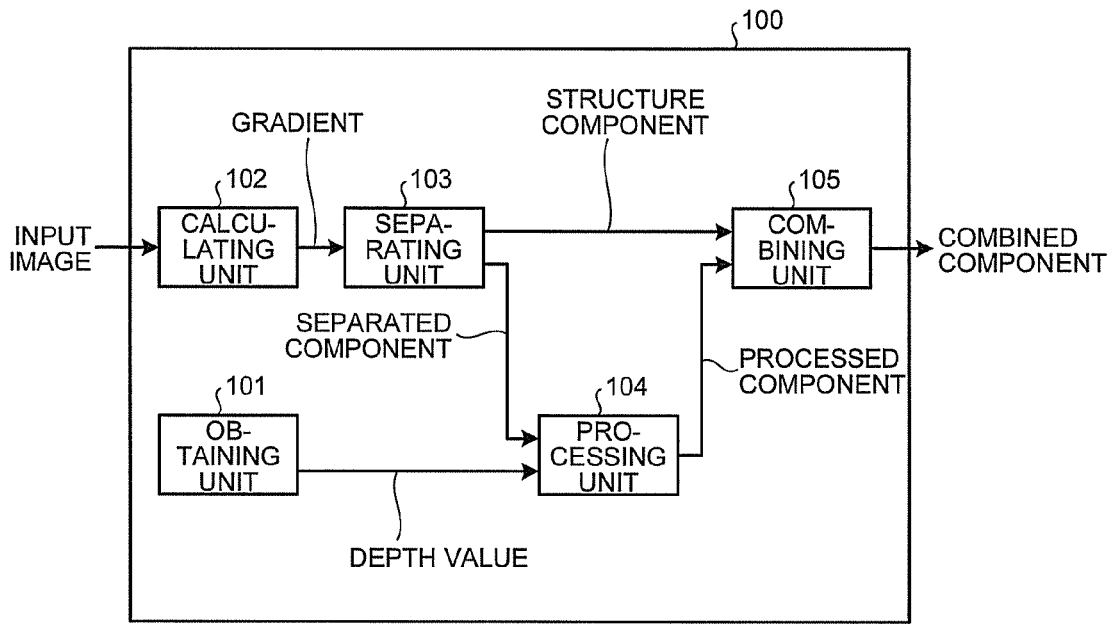
FIG. 1 is a block diagram of an image processing device according to a first embodiment.

FIG. 1 is a block diagram illustrating an example of a configuration of an image processing device according to a first embodiment. As illustrated in FIG. 1, an image processing device 100 according to the first embodiment includes an obtaining unit 101, a calculating unit 102, a separating unit 103, a processing unit 104 and a combining unit 105.

The obtaining unit 101 obtains a depth value of a subject imaged on an input image. The calculating unit 102 calculates a gradient of pixel values of the input image. The separating unit 103 separates the input image into a first component that is a component including a gradation and a second component that is a component other than the first component based on the magnitude of the gradient.

In this embodiment, the separating unit 103 separates the gradient obtained by the calculation into a structure gradient component and a separated gradient component other than the structure gradient component based on whether the magnitude of the gradient is larger than a threshold or not. Then, the separating unit 103 generates a structure component image having the structure gradient component as a gradient and a separated component image having the separated gradient component as a gradient. The structure component image includes a portion having a large gradient such as an edge. The separated gradient image includes a portion having a small gradient such as a gradation excluding an edge. Thus, the input image is separated by the separating unit 103 into the separated gradient image (first component) that is a component including a gradation and the structure component image (second component) that is a component other than the first component.

The processing unit 104 processes the separated gradient image based on the depth value to generate a processed component (processed component image). The combining unit 105 combines the structure component image and the processed component image to generate a combined component (combined component image).

Figure 2:
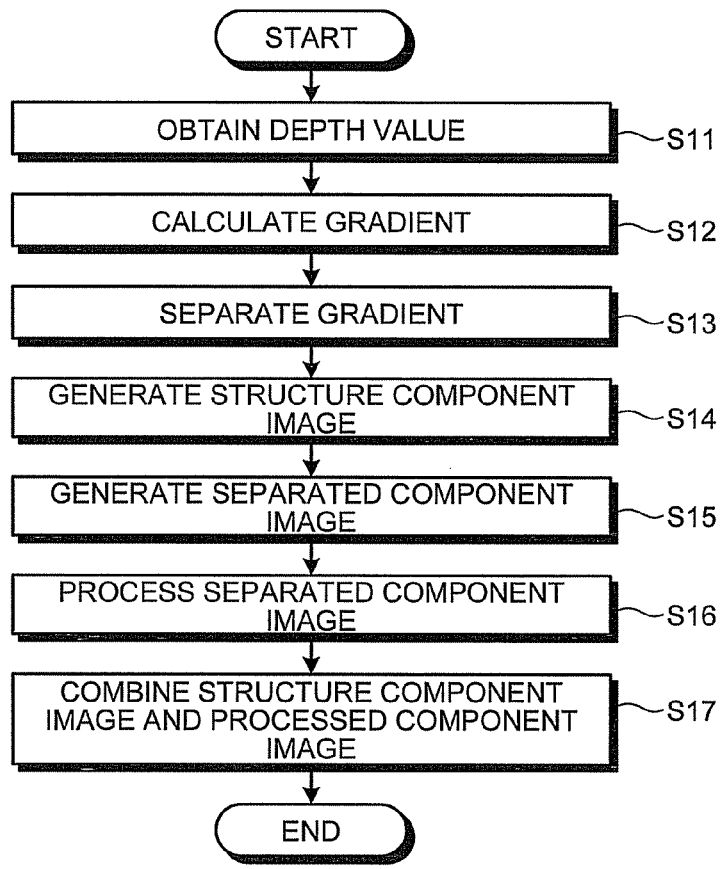
FIG. 2 is a flowchart of image processing performed by the image processing device according to the first embodiment.

Next, operations of the image processing device 100 according to the first embodiment will be described referring to FIGS. 1 and 2. FIG. 2 is a flowchart illustrating an example of a flow of the entire image processing performed by the image processing device 100 according to the first embodiment.

First, the obtaining unit 101 obtains a depth value R of a subject appearing in the input image (step S11). A depth value is a value that is obtained for each pixel of the input image and corresponds to a distance from a predetermined point of view of an imaging device such as a camera to a subject. A depth value can be obtained directly by using a range sensor, for example. Alternatively, a depth value can be obtained by using stereo images, which are a pair of images captured from two points of view, based on a disparity between the stereo images. Specifically, a depth value can be obtained by using an image for the right eye and an image for the left eye included in a stereoscopic video content. Alternatively, a depth value may be obtained by estimating the depth value from one image using information such as a blur level and a contrast of the image. It is assumed in this embodiment that the depth value R (x, y) in coordinates (x, y) is a value from 0 to 1 and represents a nearer position as the value is larger. The above-mentioned range of the depth value is merely an example. For example, a depth value that represents a nearer position as the value is smaller may alternatively be used.

Next, the calculating unit 102 calculates a gradient of the input image (step S12). The calculating unit 102 calculates a gradient $g_{in}$ by the following equation (1) where the input image is represented by $I_{in}$.

$$g_{in}(x,y)=(I_{in}(x+1,y)-I_{in}(x,y),I_{in}(x,y+1)-I_{in}(x,y)) \quad (1)$$

Here, (x, y) is an index representing coordinates. For example, $I_{in}$(x, y) represents a pixel value of $I_{in}$ at the coordinates (x, y). If a color image is input, a Y component (brightness) among YUV components is processed as a pixel value, and UV components are processed based on the Y component, for example. As expressed by equation (1), the gradient $g_{in}$(x, y) is a vector having gradients in the horizontal direction (x direction) and the vertical direction (y direction).

Next, the separating unit 103 generates a structure component image and a separated component image that remains after removing the structure component image based on the magnitude of the gradient calculated by the calculating unit 102. First, the separating unit 103 separates the gradient into a structure gradient component $g_{st}$ and a separated gradient component $g_{gr}$ based on the magnitude of the gradient (step S13). The separating unit 103 separates the gradient $g_{in}$ (x, y) into the structure gradient component $g_{st}$ and the separated gradient component $g_{gr}$ by the following equations (2) using a predetermined threshold T.

$$g_{st}(x, y) = \begin{cases} g_{in}(x, y) & \text{if } |g_{in}(x, y)| > T \\ 0 & \text{otherwise,} \end{cases} \quad (2)$$

$$g_{gr}(x, y) = \begin{cases} g_{in}(x, y) & \text{if } |g_{in}(x, y)| \le T \\ 0 & \text{otherwise} \end{cases}$$

The threshold T may be variable with the depth value. For example, the threshold T is a value that is larger as the depth value indicates deeper. For example, the separating unit 103 may calculate the threshold T(x, y) that is larger as the depth value R(x, y) is smaller (deeper) by the following equation (3). In this case, T(x, y) in equation (3) may be substituted for T in equations (2). Here, λ is a positive real number.

$$T(x,y)=\lambda(1-R(x,y)) \quad (3)$$

Figure 3:
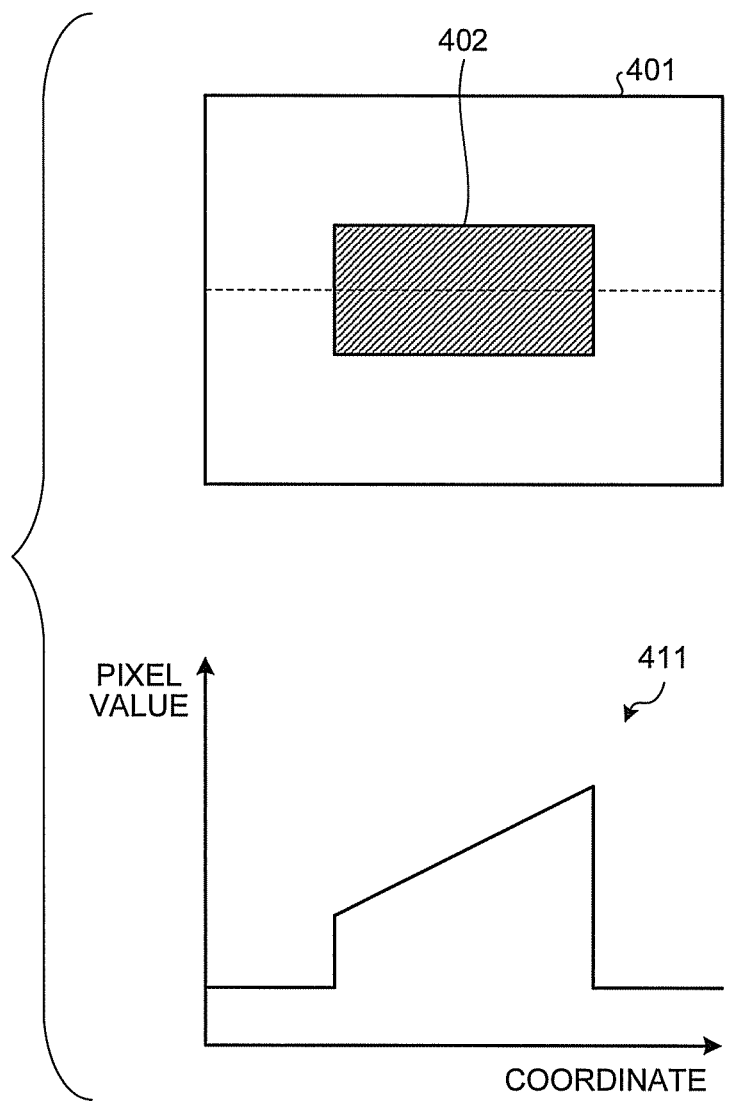
FIG. 3 is a schematic diagram illustrating a captured image.
Figure 4:
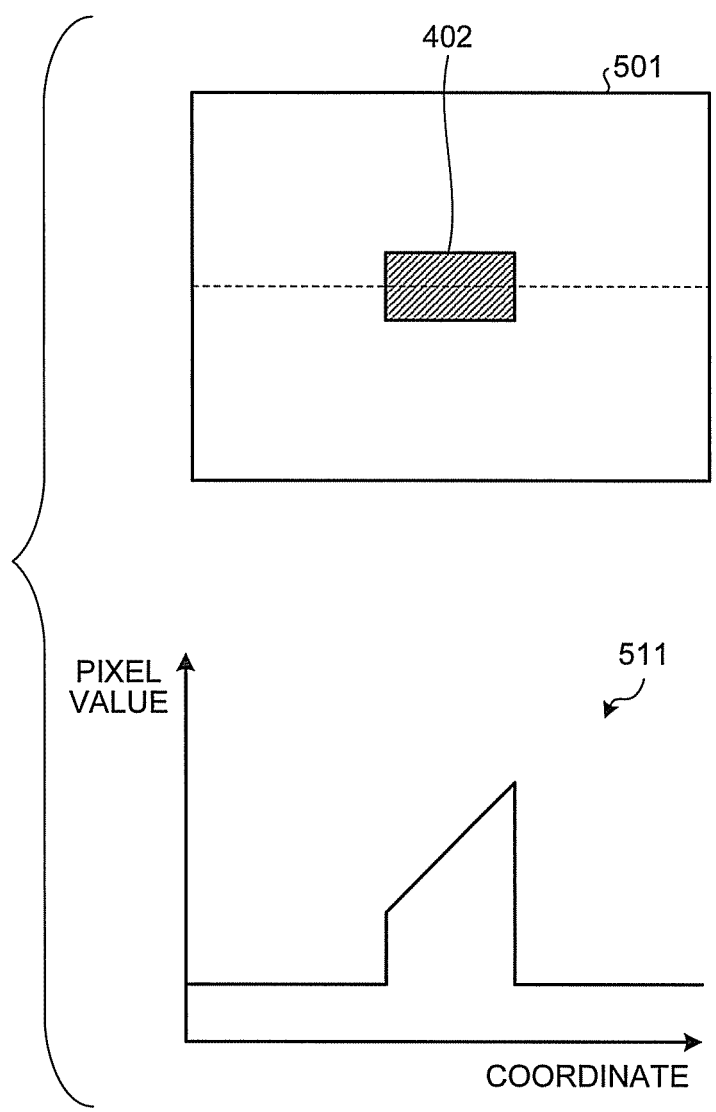
FIG. 4 is a schematic diagram illustrating a captured image.

Thus, an image can be separated into a structure component and a separated component of an object regardless of whether the object having certain unevenness information exists in a deep position or in a near position of the image. The reason for this will be described referring to FIGS. 3 and 4. FIGS. 3 and 4 are schematic diagrams illustrating images of an object captured at different depths.

It is assumed that pixel values of a line indicated by a broken line of an image 401 in FIG. 3, in which an object 402 is captured at a certain distance, are illustrated in a graph 411. The graph 411 illustrates that the object 402 has a gradation. An image 501 of FIG. 4 represents an image, in which the same object 402 is captured at a farther position as compared to the image 401 of FIG. 3. Since the object 402 is captured at a farther position, the area of the object 402 in the image is smaller. It is illustrated that the amount of change of the pixel values caused by the gradation of the object 402 is the same but the gradient of the gradation is larger as illustrated in a graph 511. Thus, it is effective to set the threshold to be larger as the depth value indicates deeper so as to extract gradation components equally when the same object is captured at different depths.

Figure 5:
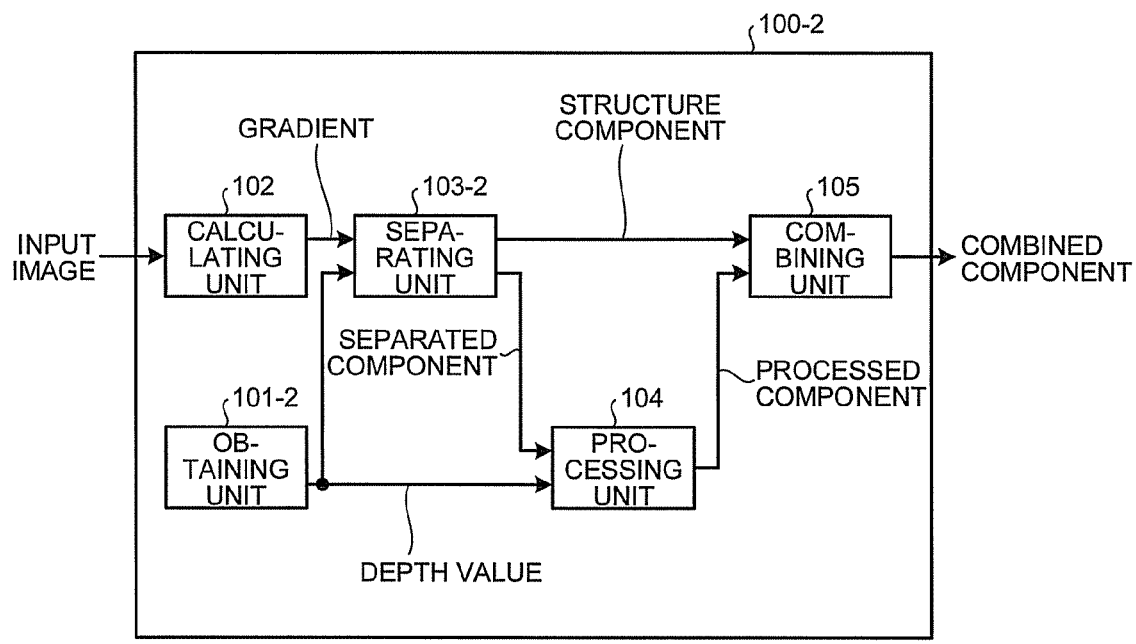
FIG. 5 is a block diagram of an image processing device that sets a threshold by using a depth value.

FIG. 5 is a block diagram illustrating an example of a configuration of an image processing device 100-2 configured to set a threshold using a depth value. The image processing device 100-2 is different from the image processing device 100 in that a depth value is input from an obtaining unit 101-2 to a separating unit 103-2.

Values of the structure gradient component $g_{st}$ and the separated gradient component $g_{gr}$ may be values representing the degree of the strength and the weakness of the gradient, respectively, rather than only values of 0 and other than 0. For example, the following equations (4) can be used instead of equations (2).

$$g_{st}(x,y)=h(g_{in}(x,y))\times g_{in}(x,y)$$

$$g_{gr}(x,y)=g_{in}(x,y)-g_{st}(x,y) \quad (4)$$

Here, h(g) is a coefficient that is a real number from 0 to 1 monotonically increasing with the magnitude of the gradient, and expressed by the following equation (5), for example. Here, σ1 and σ2 are positive real numbers.

$$h(g) = \begin{cases} 0 & (\text{for } |g| < \sigma_1) \\ (|g| - \sigma_1)/(\sigma_2 - \sigma_1) & (\text{for } \sigma_1 \le |g| \le \sigma_2) \\ 1 & (\text{for } |g| > \sigma_2) \end{cases} \quad (5)$$

Next, the separating unit 103 generates a structure component image $I_{st}$ having the structure gradient component $g_{st}$ as a gradient (step S14). A method of solving a problem by reducing it to a Poisson equation is widely known as a method for generating an image having a certain gradient (for example, R. Fattal et al., "Gradient domain high dynamic range compression", Proceedings of SIGGRAPH, pp. 249-256, 2002).

Figure 6:
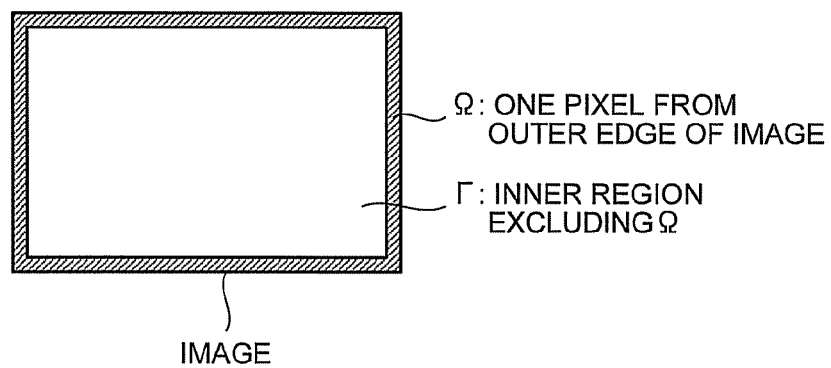
FIG. 6 is a diagram illustrating a region of an image.

The separating unit 103 calculates, by the following equation (7), an image (structure component image) $I_{st}$. In a region Ω of one pixel from the outer edge of the image illustrated in FIG. 6, the following equation (6) is satisfied representing a boundary condition that pixel values of the input image are held. In an inner region Γ excluding the region Ω, the gradient comes closer to the structure gradient component $g_{st}$.

$$I_{st}(x, y) = I_{in}(x, y) \text{ for } \forall (x, y) \in \Omega \tag{6}$$

$$I_{st} = \min_I \int\int_{(x,y)\in\Gamma} \|\nabla I - g_{st}\|^2 dx dy \tag{7}$$

where $\nabla I = (\partial I/\partial x, \partial I/\partial y)$

Equation (7) can be reduced to a Poisson equation of the following equation (8) by deformation, and solved by the Jacobi method, the Gauss-Seidel method, the SOR method or the like.

$$\nabla^2 I_{st} = \text{div } g_{st} \tag{8}$$

Alternatively, the structure component image $I_{st}$ can also be solved by processing a sine-transformed coefficient. For example, for solving the structure component image $I_{st}$ by using the Jacobi method, the following equation (9) is repeated for $(x, y) \in \Gamma$.

$$I_{st}^{n+1}(x,y) = +\tfrac{1}{4}(I_{st}^n(x+1,y)+I_{st}^n(x-1,y)+I_{st}^n(x,y+1)+I_{st}^n(x,y-1)-(\text{div } g_{st})(x,y)) \tag{9}$$

where $I_{st}^n$ is a structure component image at the n-th iteration (div g) (x, y) is calculated by the following equation (10) where a horizontal component and a vertical component of g are gx and gy, respectively.

$$(\text{div } g)(x,y) = g_x(x,y) - g_x(x-1,y) + g_y(x,y) - g_y(x,y-1) \tag{10}$$

$I_{st}^n$ after equation (9) is repeated until n reaches a number preset in advance or until the change in $I_{st}^n$ as a result of iterations becomes sufficiently small is the final structure component image $I_{st}$.

Next, the separating unit 103 generates a separated component image $I_{gr}$ that has the separated gradient component $g_{gr}$ as the gradient (step S15). The separated component image $I_{gr}$ is calculated by the following equation (12) under a condition satisfying the following equation (11).

$$I_{gr}(x, y) = 0 \text{ for } \forall (x, y) \in \Omega \tag{11}$$

$$I_{gr} = \min_I \int\int_{(x,y)\in\Gamma} \|\nabla I - g_{gr}\|^2 dx dy \tag{12}$$

A method for solving equation (11) is the same as in step S14. The separated component image can also be calculated by subtracting the structure component image from the input image.

Figure 7:
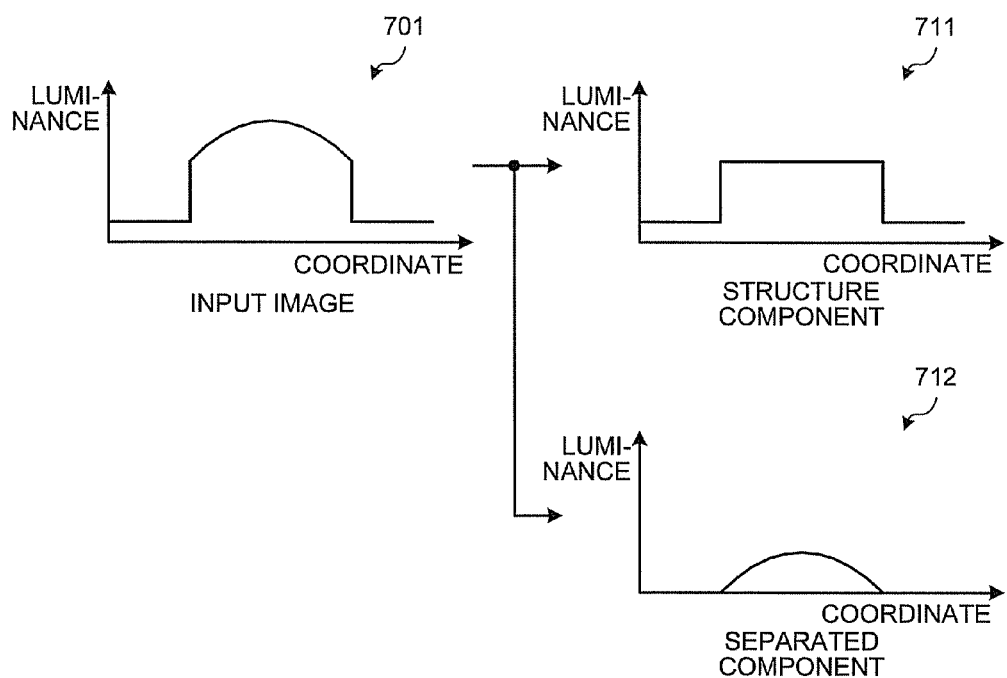
FIG. 7 is a diagram illustrating examples of a structure component image and a separated component image that are separated from an input image.

FIG. 7 is a diagram illustrating examples of a structure component image and a separated component image that are separated from an input image. Graphs therein each schematically illustrate luminance of each image one-dimensionally. When an image signal (input image) having a profile of the variation of the pixel value as illustrated in a graph 701 is input, the structure component image and the separated component image will have profiles of the variation of the pixel value as illustrated in a graph 711 and a graph 712, respectively.

As illustrated in FIG. 7, the structure component image is an image representing an average luminance between edges of the image. The separated component image is an image mainly including a gradation and subtle texture and expressing shades.

The methods for calculating the structure component image and the separated component image are not limited to those described in steps S12 to S15. For example, if a region that does not have a large gradient in an image is known in advance or if a region of a subject including a gradation in an image is known in advance, the structure component image can be calculated by averaging pixel values for each of such regions. The separated component image can be calculated by subtracting the structure component image from the input image.

Next, the processing unit 104 calculates a processed component image by processing the separated component image based on the depth value (step S16). In this embodiment, an image that is perceived in a manner that the distance in the depth direction between a subject located behind and a subject located at a nearer position is larger is generated by expressing the shades of the subject located at a nearer position to be more enhanced so as to increase uneven impression, and an image with an increased depth feel is thus obtained. A subject with increased uneven impression is perceived to be nearer. The processing unit 104 calculates the processed component image by the following equation (13) using the separated component image $I_{gr}$ and the depth value R.

$$\hat{I}_{gr}(x,y) = I_{gr}(x,y) \times \alpha(R(x,y)) \tag{13}$$

Here, α(r) is a processing coefficient that is a larger value as the depth value indicates nearer, and can be expressed by the following equation (14), for example. Here, β is a positive constant.

$$\alpha(r) = \beta r \tag{14}$$

α(r) may also be expressed nonlinearly as in the following equation (15) by additionally using a positive constant ω.

$$\alpha(r) = \omega e^{-\beta r^2} \tag{15}$$

As described above, it is possible to set the processing coefficient α to a positive value. If the processing coefficient α is larger than 1, the separated component image is enhanced and the shades of the output image are enhanced. On the other hand, if the processing coefficient α is smaller than 1, the separated component image is suppressed and the shades of the output image become weaker. In addition, processing of the separated component image is not limited to multiplication of the processing coefficient α. For example, an absolute value may be added as in the following equation (16).

$$\hat{I}_{gr}(x,y) = \text{sign}(I_{gr}(x,y)) \times (|I_{gr}(x,y)| + \alpha(R(x,y))) \tag{16}$$

Here, sign(i) is a positive or negative sign of i. Alternatively, a table in which a value is converted to be larger with the distance may be prepared in advance and the absolute value of the separated component image may be converted according to the table.

In the example presented here, a value representing the nearest position of all possible values of the depth value is set to a reference value, and the separated component image is more enhanced as the difference between the reference value and the depth value is smaller. However, the reference value is not limited thereto. A depth value representing a depth at an intermediate position or a depth value representing the deepest position may be set to the reference value, and the separated component image may be more enhanced as the depth value is closer to the reference value. For example, assuming that a depth value at an intermediate position is $r_{base}$, α that increases as the depth value R(x, y) is closer to $r_{base}$ may be used in equation (13). α can be a value expressed by the following equation (17) where ω is a positive constant, for example.

$$\alpha(r) = \omega e^{-\beta(r - r_{base})^2} \quad (17)$$

As a result, in a case where only a position at a certain depth value $r_{base}$ is intensely illuminated or in like cases, the subject at the position can be expressed in an enhanced manner.

Finally, the combining unit 105 combines the structure component image $I_{st}$ and the processed component image calculated by equation (13) to generate a combined component image (step S17). The combining unit 105 generates a combined component image $I_{comb}$ by the following equation (18), for example.

$$I_{comb}(x,y) = I_{st}(x,y) + \hat{I}_{gr}(x,y) \quad (18)$$

The combined component image $I_{comb}$ generated by the processing as described above is an output image from the image processing device 100 according to this embodiment.

As described above, with the image processing device 100 according to the first embodiment, components representing shades in an image are expressed in a manner that a component of a subject at a nearer position is more enhanced. Therefore, it is possible to obtain an image in which expressiveness of the distance in the depth direction between subjects is increased and the three-dimensional appearance is enhanced.

Second Embodiment

Figure 8:
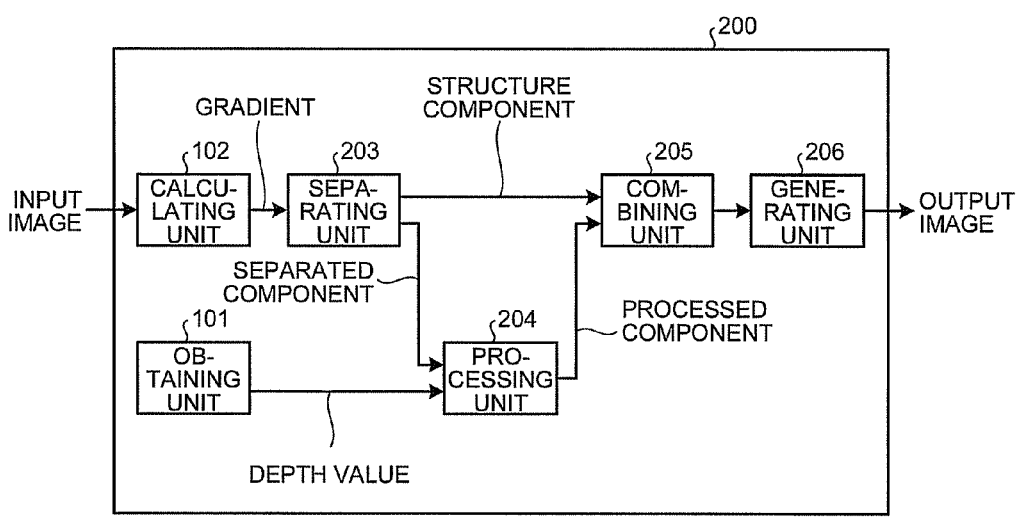
FIG. 8 is a block diagram of an image processing device according to a second embodiment.

FIG. 8 is a block diagram illustrating an example of a configuration of an image processing device 200 according to a second embodiment. As illustrated in FIG. 8, the image processing device 200 according to the second embodiment includes an obtaining unit 101, a calculating unit 102, a separating unit 203, a processing unit 204 and a combining unit 205.

The second embodiment is different from the first embodiment in the functions of the separating unit 203, the processing unit 204 and the combining unit 205 and in that a generating unit 206 is added. The other components and functions are the same as in FIG. 1 that is a block diagram illustrating the configuration of the image processing device 100 according to the first embodiment. Therefore, these are indicated by the same reference numerals and explanation thereof will not be repeated here.

The separating unit 203 separates a gradient calculated from an input image into a first component that is a component including a gradation and a second component that is a component other than the first component based on the magnitude of the gradient. In this embodiment, a separated gradient component and a structure gradient component obtained by separation based on whether the values are larger than a threshold or not correspond to the first component and the second component, respectively.

The processing unit 204 processes the separated gradient component based on the depth value to generate a processed component (processed separated gradient component). The combining unit 205 combines the structure gradient component and the processed separated gradient component to generate a combined component (combined gradient component). The generating unit 206 generates an image having the combined gradient component as a gradient.

Figure 9:
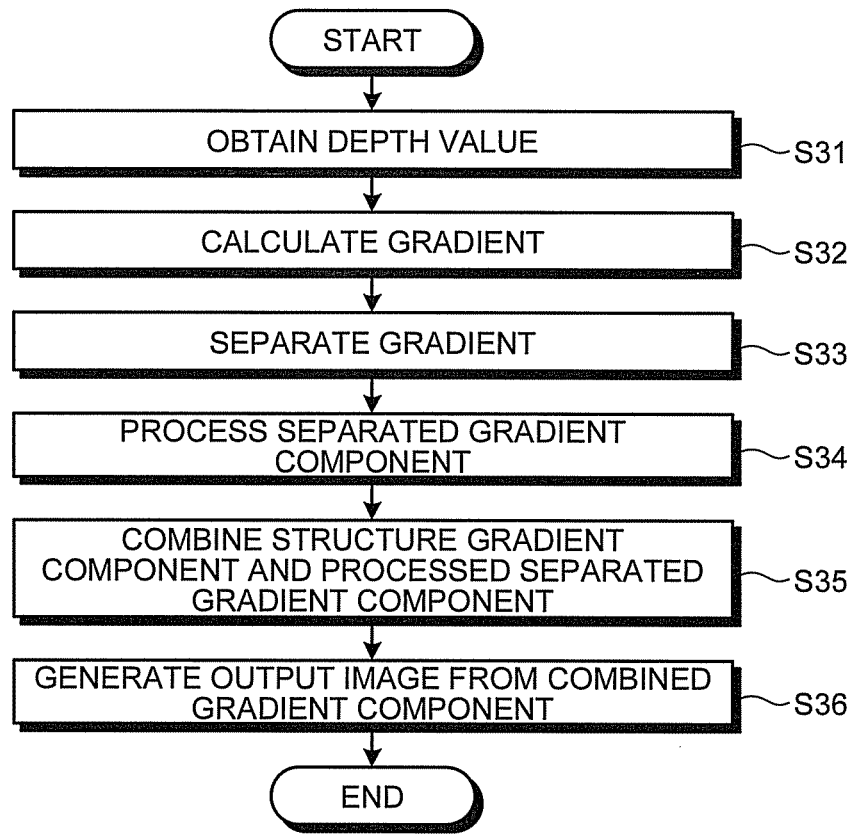
FIG. 9 is a flowchart of image processing performed by the image processing device according to the second embodiment.

Next, operations of the image processing device 200 according to the second embodiment will be described referring to FIGS. 8 and 9. FIG. 9 is a flowchart illustrating an example of a flow of the entire image processing performed by the image processing device 200 according to the second embodiment.

Since processing from step S31 to step S33 is similar to that from step S11 to step S13 of the image processing device 100 according to the first embodiment, the description thereof will not be repeated.

Next, the processing unit 204 processes the separated gradient component based on the depth value to calculate the processed separated gradient component (step S34). Here, a method of expressing shades of a nearer subject in a more enhanced manner is described similarly to the first embodiment. However, the reference for the depth at which shades are enhanced may be a depth of an intermediate position between the deepest position and the nearest position or of the deepest position instead of the nearest position. The processing unit 204 calculates the processed separated gradient component by the following equation (19).

$$\hat{g}_{gr}(x,y) = g_{gr}(x,y) \times \alpha(R(x,y)) \quad (19)$$

Here, α(r) is a processing coefficient that is a larger value as the depth value is nearer, and can be expressed by equation (15) or equation (17). A horizontal component and a vertical component of $g_{gr}(x, y)$ may be processed using different coefficients.

Next, the combining unit 205 generates a combined gradient component $g_{comb}$ from the structure gradient component $g_{st}$ and the processed separated gradient component calculated by equation (19) (step S35). The combining unit 205 calculates the combined gradient component $g_{comb}$ by adding the structure gradient component $g_{st}$ and the processed separated gradient component as in the following equation (20).

$$g_{comb} = g_{st} + \hat{g}_{gr} \quad (20)$$

Next, the generating unit 206 generates an image having the combined gradient component $g_{comb}$ as an output image $I_{out}$ from the image processing device 200 according to the second embodiment (step S36). Operations of the generating unit 206 are the same as those described in steps S14 and S15 of the first embodiment. The generating unit 206 calculates the output image by the following equation (22). In the region Ω of one pixel from the outer edge of the image illustrated in FIG. 6, the following equation (21) is satisfied representing a boundary condition that pixel values of the input image are held. In the inner region Γ excluding the region Ω, the gradient component comes closer to $g_{comb}$.

$$I_{out}(x, y) = I_{in}(x, y) \text{ for } \forall (x, y) \in \Omega \quad (21)$$

$$I_{out} = \min_{I} \int \int_{(x,y) \in \Gamma} \|\nabla I - g_{comb}\|^2 dx dy \quad (22)$$

Equation (22) can be solved by using the Jacobi method, for example, and the output image can be obtained by repeating the following equation (23).

$$I_{out}^{n+1}(x,y) = \tfrac{1}{4}(I_{out}^n(x+1,y) + I_{out}^n(x-1,y) + I_{out}^n(x,y+1) + I_{out}^n(x,y-1) - (\text{div } g_{comb})(x,y)) \quad (23)$$

where $I_{out}^n$ is an output image at the n-th iteration $I_{out}^n$ after equation (23) is repeated until n reaches a number preset in advance or until the change in $I_{out}^n$ as a result of iterations becomes sufficiently small is the final output image $I_{out}$.

As described above, with the image processing device 200 according to the second embodiment, components representing shades in an image are expressed in a manner that a component of a subject at a nearer position is more enhanced. Therefore, it is possible to obtain an image in which expressiveness of the distance in the depth direction between subjects is increased and the three-dimensional appearance is enhanced.

In the first embodiment, steps S14 and S15, which are computationally expensive image generation processing from gradient components, are performed before step S16 that is processing of a separated component. As a result, the processing can proceed to step S17 without performing the processing in steps S14 and S15 even if the processing coefficient α is changed. Thus, the computational cost when the processing coefficient is changed can be reduced. In the second embodiment, an output image is generated from a combined gradient component, and it is thus possible to obtain an image having a more natural gradation.

Although procedures of processing the three-dimensional appearance of an image are presented in the embodiments above, it is also possible to process a moving image by processing frames of the moving image. In addition, it is possible to generate a three-dimensional image with enhanced three-dimensional appearance by processing each image of a three-dimensional image content including two images for the right eye and the left eye. Further, for a system that displays a three-dimensional image by displaying images with disparities between a display and a plurality of points of view, a three-dimensional image with enhanced three-dimensional appearance can be generated by processing each of the images.

As described above, it is possible to generate an image with an increased depth feel and having a three-dimensional appearance according to the first and second embodiments.

Figure 10:
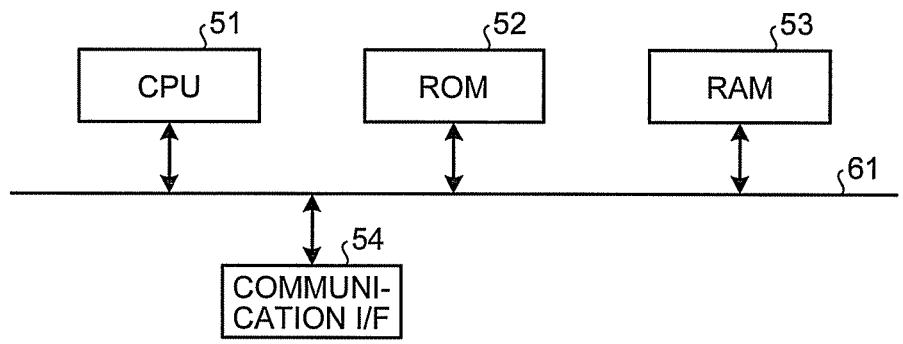
FIG. 10 is a hardware configuration diagram of the image processing device of the first or second embodiment.

Next, a hardware configuration of an image processing device according to the first or second embodiment will be described referring to FIG. 10. FIG. 10 is an explanatory diagram illustrating a hardware configuration of the image processing device according to the first or second embodiment.

The image processing device according to the first or second embodiment includes a controller such as a central processing unit (CPU) 51, a storage unit such as a read only memory (ROM) 52 and a random access memory (RAM) 53, a communication I/F 54 connected to a network for communication, an external storage device such as a hard disk drive (HDD) and a compact disc (CD) drive, a display device such as a display, an input device such as a keyboard and a mouse, and a bus 61 that connects the components, which is a hardware configuration utilizing a common computer system.

Image processing programs to be executed by the image processing device according to the first or second embodiment are recorded on a computer readable recording medium such as a compact disk read only memory (CD-ROM), a flexible disk (FD), a compact disk recordable (CD-R) and a digital versatile disk (DVD) in a form of a file that can be installed or executed, and provided as a computer program product.

Alternatively, the image processing programs to be executed by the image processing device according to the first or second embodiment may be stored on a computer system connected to a network such as the Internet, and provided by being downloaded via the network. Alternatively, the image processing programs to be executed by the image processing device according to the first or second embodiment may be provided or distributed through a network such as the Internet.

Still alternatively, the image processing programs in the first or second embodiment may be embedded on a ROM or the like in advance and provided therefrom.

The image processing programs to be executed by the image processing device according to the first or second embodiment have modular structures including the respective units (obtaining unit, calculating unit, separating unit, processing unit, combining unit and the like). In an actual hardware configuration, the CPU 51 (processor) reads the image processing programs from the recording medium mentioned above and executes the programs, whereby the respective units are loaded on a main recording medium and generated thereon.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device, comprising:
an obtaining unit that obtains a depth value for each pixel of an input image;
a separating unit that separates a gradient of pixel value for each pixel of the input image into a first gradient and a second gradient and that generates a first component image and a second component image, the first gradient including a gradient of a pixel having the gradient whose magnitude is equal to or smaller than a threshold, the second gradient including the gradient of a pixel having a gradient whose magnitude is larger than the threshold, the first component image having the first gradient as a gradient of pixel value for a pixel corresponding to the first gradient, the second component image having the second gradient as a gradient of pixel value for a pixel corresponding to the second gradient
a processing unit that enhances each pixel the first component image in accordance with the depth value to generate a processed component image; and
a combining unit that combines the processed component image and the second component image to generate a combined component image, wherein,
the processing unit increases an enhancement degree of the first component image as a difference between a preset reference value and the depth value decreases.

2. The device according to claim 1, wherein
the reference value is a value representing a nearest position of all possible values of the depth value.

3. An image processing device, comprising:
an obtaining unit that obtains a depth value for each pixel of an input image;
a separating unit that separates a gradient of pixel value for each pixel of the input image into a first gradient and a second gradient, the first gradient including a gradient of a pixel having the gradient whose magnitude is equal to or smaller than a threshold, the second gradient including a gradient of a pixel having the gradient whose magnitude is larger than the threshold;
a processing unit that enhances, for each pixel, the first gradient in accordance with the depth value to generate a processed gradient;
a combining unit that combines, for each pixel, the processed gradient and the second gradient to generate a combined gradient; and a generating unit that generates an image having the combined gradient as a gradient of pixel values, wherein
the processing unit increases an enhancement degree of the first component image as a difference between a preset reference value and the depth value decreases.

4. The device according to claim 3, wherein
the separating unit separates the input image into the first component and the second component by using a threshold that is smaller as the depth value indicates nearer.

5. An image processing device, comprising:
a processing circuit that
obtains a depth value for each pixel of an input image;
separates a gradient of pixel value for each pixel of the input image into a first gradient and a second gradient, and generates a first component image and a second component image, the first gradient including a gradient of a pixel having the gradient whose magnitude is equal to or smaller than a threshold, the second gradient including a gradient of a pixel having the gradient whose magnitude is larger than the threshold, the first component image having the first gradient as a gradient of pixel value for a pixel corresponding to the first gradient, the second component image having the second gradient as a gradient of pixel value for a pixel corresponding to the second gradient;
enhances each pixel of the first component image in accordance with the depth value to generate a processed component image; and
combines the processed component image and the second component image to generate a combined component image, wherein
the processing circuit increases an enhancement degree of the first component image as a difference between a preset reference value and the depth value decreases.

6. The device according to claim 5, wherein
the reference value is a value representing a nearest position of all possible values of the depth value.

7. An image processing device, comprising:
a processing circuit that:
obtains a depth value for each pixel of an input image;
separates a gradient of pixel value for each pixel of the input image into a first gradient and a second gradient, the first gradient including a gradient of a pixel having the gradient whose magnitude is equal to or smaller than a threshold, the second gradient including a gradient of a pixel having the gradient whose magnitude is larger than the threshold;
enhances, for each pixel, the first gradient in accordance with the depth value to generate a processed gradient;
combines, for each pixel, the processed gradient and the second gradient to generate a combined gradient; and
generates an image having the combined gradient as a gradient of pixel values, wherein
the processing circuit increases an enhancement degree of the first component image as a difference between a preset reference value and the depth value decreases.

8. The device according to claim 7, wherein
the processing circuit separates the input image into the first component and the second component by using a threshold that is smaller as the depth value indicates nearer.

9. An image processing method, comprising:
obtaining a depth value for each pixel of an input image;
separating a gradient of pixel value for each pixel of the input image into a first gradient and a second gradient, and generating a first component image and a second component image, the first gradient including a gradient of a pixel having the gradient whose magnitude is equal to or smaller than a threshold, the second gradient including a gradient of a pixel having the gradient whose magnitude is larger than the threshold, the first component image having the first gradient as a gradient of pixel value for a pixel corresponding to the first gradient, the second component image having the second gradient as a gradient of pixel value for a pixel corresponding to the second gradient
enhancing each pixel the first component image in accordance with the depth value to generate a processed component image; and
combining the processed component image and the second component image to generate a combined component image, wherein
the enhancing includes increasing an enhancement degree of the first component image as a difference between a preset reference value and the depth value decreases.

10. The method according to claim 9, wherein
the separating includes
separating the input image into the first component and the second component by using a threshold that is smaller as the depth value indicates nearer.

11. An image processing method, comprising:
obtaining a depth value for each pixel of an input image;
separating a gradient of pixel value for each pixel of the input image into a first gradient and a second gradient, the first gradient including a gradient of a pixel having the gradient whose magnitude is equal to or smaller than a threshold, the second gradient including a gradient of a pixel having the gradient whose magnitude is larger than the threshold;
enhancing, for each pixel, the first gradient in accordance with the depth value to generate a processed gradient;
combining, for each pixel, the processed gradient and the second gradient to generate a combined gradient; and
generating an image having the combined gradient as a gradient of pixel values, wherein
the enhancing includes increasing an enhancement degree of the first component image as a difference between a preset reference value and the depth value decreases.

12. The method according to claim 11, wherein
the separating includes
separating the input image into the first component and the second component by using a threshold that is smaller as the depth value indicates nearer.

* * * * *